Dec. 10, 1946.  G. A. IBACH ET AL  2,412,220
TREATMENT OF FLUORINE-CONTAINING HYDROCARBON MIXTURES
Filed Jan. 3, 1944
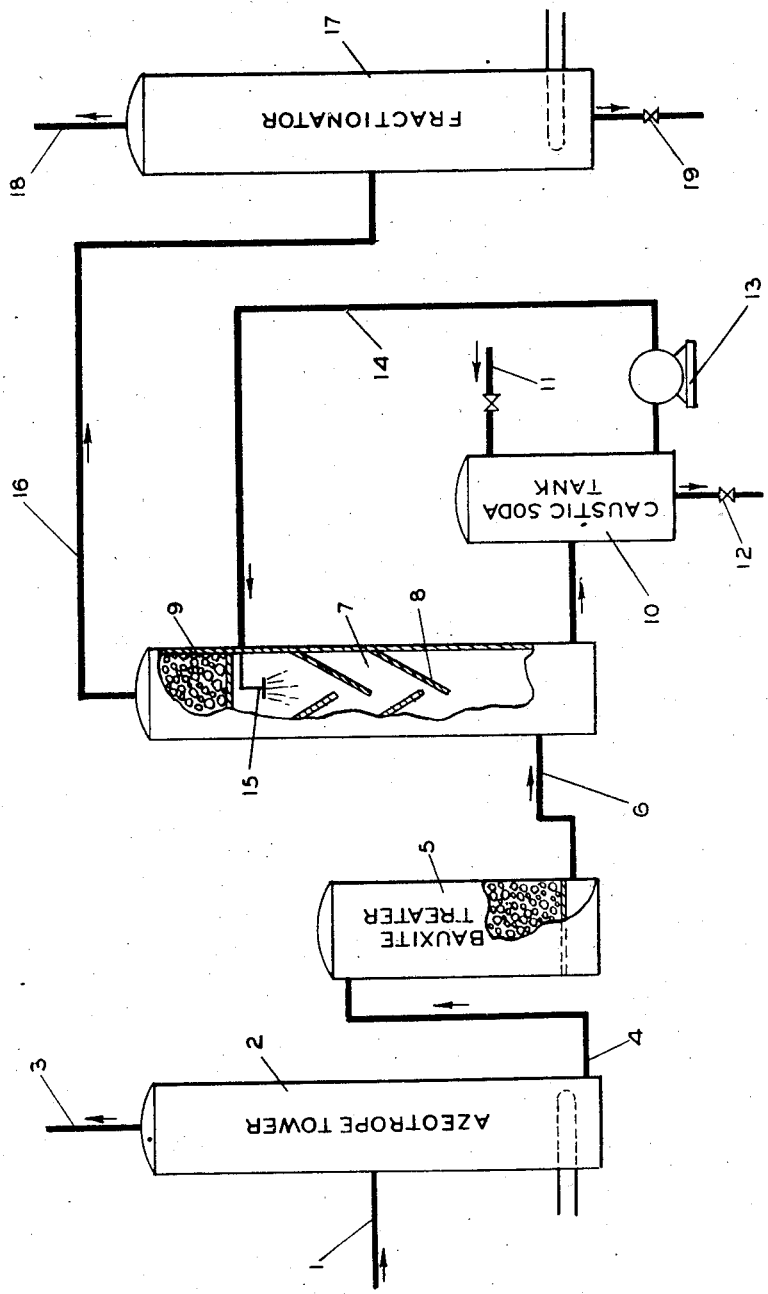
INVENTORS
G. A. IBACH & C. C. TATE
BY Hudson, Young and Ginger
ATTORNEYS

UNITED STATES PATENT OFFICE 2,412,220

TREATMENT OF FLUORINE-CONTAINING HYDROCARBON MIXTURES

Gerald A. Ibach, Borger, Tex., and Carmen C. Tate, Okmulgee, Okla., assignors to Phillips Petroleum Company, a corporation of Delaware Application January 3, 1944, Serial No. 516,868

5 Claims. (Cl. 196—41)

The present invention relates to the treatment of hydrocarbon materials and more particularly to the removal from such materials of fluorine-containing compounds, both organic and inorganic, which may be present therein as a result of treatment with hydrogen fluoride, concentrated hydrofluoric acid or boron trifluoride which were used to facilitate polymerization, alkylation or other reactions.

The use of hydrogen fluoride, hydrofluoric acid and boron trifluoride and solutions of boron trifluoride in water as catalysts for the polymerization of unsaturated hydrocarbons and for the alkylation of hydrocarbons with unsaturated hydrocarbons has been widely adopted. Such processes are described, for example, in Frey Patents No. 2,322,800 and 2,317,901 and also in the articles by Frey in Chemical and Metallurgical Engineering, 1943, vol. 50, pages 126 to 128 (November, 1943) and Philnews, December, 1943, pages 7 to 10. After treatment of hydrocarbon-containing mixtures therewith these catalysts must be removed. The removal of the greater portion of these catalytic materials from the treated products is a relatively simple matter but many unforeseen difficulties arise in attempting to effect the complete removal of these fluorine-containing catalysts and any fluorine-containing compounds which result from side reactions.

It is an object of the present invention to provide a process for the substantially complete removal of small residual amounts of fluorine-containing compounds from hydrocarbons and hydrocarbon-containing mixtures that have been treated with hydrogen fluoride, hydrofluoric acid, boron trifluoride or compositions containing them.

It is a further object of the invention to provide such a process which is simple and economical.

Other objects of the invention, some of which are more specifically referred to hereinafter, will be apparent to those skilled in the art to which the invention pertains.

In the copending application of Frederick E. Frey, Serial No. 398,361, filed June 16, 1941 (Patent No. 2,347,945 issued February 15, 1944) is disclosed a process of removing residual amounts of organic fluorine compounds from a mixture of paraffin hydrocarbons containing such organic fluorine compounds, which comprises subjecting said mixture to the action of a solid porous metal oxide such as bauxite, which is catalytically active for hydrogenation and dehydrogenation reactions, under suitable conditions. Such conditions include reaction temperatures within the range of approximately 70° to 550° F. Superatmospheric pressures, for example, such as are required to maintain the material being treated in the liquid phase, may be used, although the process may be conducted in the vapor phase at normal pressures. Instead of bauxite, alumina gels, chromium oxide, zirconium oxide, magnesium oxide and calcium oxide and oxides of metals of the iron group, especially finely divided nickel deposited on an inert support, may be used. The reactions which occur with said metal oxide are not clearly understood but some of the organic fluorine-containing compounds are probably decomposed to hydrogen fluoride. Any hydrogen fluoride present therein or formed in the treatment reacts with the bauxite to form nonvolatile compounds with the bauxite and some hydrogen fluoride may react with any silica that may be present in the bauxite to produce silicon tetrafluoride or hydrofluosilicic acid, which remains in the hydrocarbon material.

In conducting such a process as described in said copending application of Frederick E. Frey the bauxite or other metal oxide may become spent, either partially or completely, during the operation, in which event the organic fluorides will not be completely or will be but incompletely removed. If channeling occurs in the bed of metal oxide, the removal may also be incomplete. Furthermore, if any hydrofluoric acid or compound which is capable of liberating hydrogen fluoride or hydrofluoric acid is present in the material being treated, it may be unremoved or may be but partially removed in this manner.

If the bauxite which is being used for the treatment contains silica, as most bauxite samples generally do, hydrofluoric acid or hydrogen fluoride, if present originally or if formed during the treatment, may react with such silica and form silicon tetrafluoride or hydrofluosilicic acid which may be left in the hydrocarbon. Also, if the conditions of temperature, pressure and flow rate are not adjusted properly, the treatment with bauxite or other of the specified metal oxides may be only partially effective and may be accompanied by such reactions whereby organic fluorides together with hydrogen fluoride, silicon tetrafluoride or other inorganic fluorides appear or are formed and appear in the product of the treatment. The process of the present invention is directed to the prevention or avoidance of any of these difficulties which may arise in the defluorination of hydrocarbon materials.

It has been observed during the course of continued operation of such a defluorination process, in which the material after treatment with bauxite is subjected to fractional distillation, that a coating, cake or deposit of solid matter accumulates in the fractional distillation apparatus and that the pipes or conduits through which the treated material circulates become clogged with such deposits. The apparatus, which is usually of iron or other metal also becomes corroded. The source of this deposit, which contains an appreciable quantity of silica, is evidently the silicon tetrafluoride, silicic and/or fluosilicic acids in the defluorinator effluent, and which are probably formed from siliceous matter present in the bauxite or other naturally occurring metal oxides. Although the amount of this deposit is negligible at the start of operations, it becomes greater as the bauxite becomes spent and as the treatment progresses.

Some of the aforesaid difficulties are partially obviated by using a series of bauxite chambers, and so operating that the material leaving the treaters or chambers comes into contact in the last chamber of the series with fresh bauxite. Such operation is costly, however, and uneconomical of bauxite, and, furthermore, requires careful control and frequent observation.

In accordance with our invention, the foregoing difficulties are entirely obviated, or obviated to a great degree, by subjecting the hydrocarbon material that has been treated with bauxite or other metal oxide to treatment with sodium hydroxide or other alkaline solution and then to filtration through an essentially non-siliceous granular filtering medium before being subjected to distillation.

The filtering medium must, of course, be resistant to the action of alkaline solutions and be non-packing so that it is pervious to liquids and gases and may be readily wetted by aqueous liquids. Suitable filtering media are anthracite coal, petroleum coke, wood charcoal, and the like, which may contain small amounts of silica but which are essentially nonsiliceous. A metal filter, such as screenings or turnings of copper, silver, Monel metal or other metals or metal alloys that are not affected by hydrofluoric acid, may also be used. The function of the filtering medium is to remove any droplets of aqueous alkaline solution which may be entrained or carried over or be present in the hydrocarbon being treated. When siliceous filtering media are used, they may become clogged by the action of the alkaline solution on the silica. When the sodium hydroxide solution becomes spent or its circulation to the washing unit is stopped, deposits of solids may form in the fractionating unit as a result of the contact of the hydrocarbon material containing fluorine compounds with a siliceous filtering material whereby silicon compounds are formed and are carried over with the hydrocarbon.

Aqueous solutions of sodium hydroxide are the preferred treating solutions. However, solutions of potassium hydroxide, sodium carbonate, sodium bicarbonate, potassium carbonate, borax or similar alkaline substances or mixtures thereof, in water or other solvents, may be used, although their effectiveness for the purpose may be somewhat less than that of an aqueous solution of sodium hydroxide.

The accompanying drawing is a flow diagram of a process that is a preferred embodiment of our invention. In this preferred process, the hydrocarbon layer remaining after the separation of liquid hydrogen fluoride or concentrated hydrofluoric acid is charged through inlet 1 to an azeotrope tower 2. This hydrocarbon charge may be the hydrocarbon materials which are formed in a polymerization or an alkylation process, for example, it may be the alkylate resulting from the treatment of isobutane with a butene-containing $C_4$ hydrocarbon fraction or a pure butene in the presence of liquid hydrogen fluoride to produce isooctane, or any reactions comprising hydrofluoric acid as catalyst. Besides the desired product, the hydrocarbon material will normally contain unalkylated low boiling hydrocarbons and dissolved or entrained liquid hydrogen fluoride or other catalytic material and organic fluorine compounds.

The hydrocarbon charge is subjected to fractional distillation in azeotrope tower 2. The overhead fraction of the distillation is discharged at 3 and normally consists of a mixture of the low-boiling hydrocarbons and liquid hydrogen fluoride as an azeotropic mixture. This overhead fraction or distillate may be sent to an acid settler or similar device for separating the hydrocarbons from the hydrogen fluoride, which generally separate when the distillate is condensed. These separated materials may be returned or recycled to the reactor or alkylator and reused. The bottom fraction which is substantially devoid of free or uncombined hydrogen fluoride as a result of the distillation is charged through conduit 4 to bauxite treater 5. In the event that the hydrocarbon material is substantially free of hydrogen fluoride or concentrated hydrofluoric acid, the treatment or distillation in the azeotrope tower may be omitted and the hydrocarbon material charged directly to the bauxite treater.

The treatment with bauxite or other porous metal oxide which is catalytically active for hydrogenation and dehydrogenation reactions is conducted in bauxite treater 5 substantially as described in the copending application of Frederick E. Frey, Serial No. 398,361 (Patent No. 2,347,945 issued February 15, 1944). Thus the temperature of the treatment may be within the range of approximately 70° to approximately 550° F. and the pressure may be sufficient or greater than that necessary to maintain the material in liquid phase. Although one bauxite treater is represented in the drawing, preferably two or more are used and they are generally of such capacity that sufficient defluorination is effected. These treaters are also arranged so that the material passes through that containing the most active or least spent treating agent last and provision is preferably made for recharging the treaters so that operations will not be discontinued while one is being recharged.

The treated hydrocarbon material then passes through conduit 6 to tower 7 which is a washing and filtering tower provided with baffles 8 and in which filtering material 9 is disposed. The washing medium, which may be sodium hydroxide or caustic soda solution or one of the other materials hereinbefore referred to, is charged to tank 10 through inlet 11. After tank 10 and the washing system are filled, sufficient material is added at inlet 11 to compensate for that withdrawn from tank 10 through outlet valve 12. The wash liquid is pumped from tank 10 by means of pump 13 through conduit 14 and into tower 7 through a nozzle or spray 15 or other suitable distributing device. The defluorinated hydrocarbon material that has been treated with bauxite or other defluorinating agent in treater 5 passes up through the tower 7 where it is washed with the sodium hydroxide solution and is then filtered through the bed of filtering material 9. It is then charged through conduit 16 to fractionator 17. The filtering material is preferably granular anthracite coal or coke or other essentially nonsiliceous granular filtering medium as hereinbefore described. The bed should be of a thickness sufficient to remove substantially all entrained washing solution.

In the event that the hydrocarbon material is not contacted with the washing solution, any silicon tetrafluoride or hydrofluosilicic acid may be condensed on the filtering material and thus will not pass through to the fractionator. Furthermore, if hydrogen fluoride is left in the hydrocarbon material after the washing treatment, no silicon tetrafluoride which might be carried over into the fractionator will be formed in the filter. The presence of hydrogen fluoride in the fractionator is less detrimental than the presence of silicon tetrafluoride.

The concentration of the washing solution may be varied over a wide range, dependent upon the amount of purification required, and the capacity of the washing tower 7, the degree of circulation of the solution and the intimacy of the contact between the hydrocarbon material and the solution. Ordinarily an aqueous solution containing from 1 to approximately 20% by weight or more of sodium hydroxide is used. The temperature of the washing treatment may also be varied over a wide range, being normally between approximately 30° to approximately 200° F. and preferably between 60° and 100° F.

Fractionator 17 and subsequent fractionators not shown separate the total hydrocarbons into required recycle and effluent products of the process. The overhead product leaves the fractionator 17 through outlet 18 and the kettle product through outlet 19, and these may be either final yield or recycle streams or intermediate streams requiring further separation, as is evident to one skilled in the art.

It is to be understood that the foregoing description is merely illustrative, that the drawing is merely a diagrammatic representation of the flow of materials in the process, and that the actual apparatus which will be required may include heaters, pumps, valves (some of which are represented), pressure gauges, flow meters, heat exchangers, reflux accumulators, surge tanks, and other conventional equipment which will be understood by those skilled in the art to which the invention pertains.

It is further contemplated that the apparatus will be constructed of metals and other materials which are inert or resistant to hydrofluoric acid and/or other substances which are used in contact with the apparatus. Such materials of construction are described in the article by Charles M. Fehr, "Materials of construction for anhydrous hydrofluoric acid" in Chem. Met. Eng., 1943, vol. 50, page 129 (November, 1943) and in the articles of Frey referred to hereinbefore.

Although the foregoing process has been described particularly in connection with defluorination of hydrocarbon materials that have been produced or treated with liquid hydrogen fluoride or concentrated hydrofluoric acid catalysts, it is applicable generally to the treatment of all hydrocarbon materials which contain fluorine-containing compounds capable of engendering hydrogen fluoride or hydrofluoric acid by hydrolysis or by thermal decomposition or decomposition in the presence of bauxite or other materials with which the hydrocarbon material is contacted or which are capable of engendering silicon tetrafluoride or hydrofluosilicic acid in contact with materials used in earlier stages of the process. Thus, the process of the invention is also applicable to the treatment of hydrocarbon materials containing boron fluoride, which may be present as a result of the use of boron fluoride or hydrofluoric acid containing boron fluoride as catalysts, or the treatment of hydrocarbon materials containing alkyl fluorides or other organic fluorides that may be unstable to heat or to materials used in the defluorination process.

The process of the invention has been described particularly in connection with a hydrocarbon alkylation process, that is, a process in which one hydrocarbon is alkylated with another hydrocarbon and more specifically in which an aliphatic paraffin hydrocarbon is alkylated with an olefin hydrocarbon. However, it is to be understood that it is applicable generally to effluents of the treatment of any alkylatable hydrocarbon, saturated or unsaturated, aliphatic, aromatic or cycloaliphatic, with an alkylating reagent, namely, unsaturated hydrocarbons, halides or alcohols, and that the term alkylation includes polymerization. It can also be used to treat effluents of isomerization processes in which hydrofluoric acid is used as a catalyst.

Generally the hydrocarbon material which will be subjected to treatment with alkaline solutions according to the process of the invention will be in liquid phase but it is obvious that the process is capable of being used for the treatment of hydrocarbon materials in gaseous or vapor phase in known manner.

Inasmuch as the foregoing specification is merely illustrative and comprises preferred embodiments of the invention it is to be understood that the invention is not limited thereto and that modifications may be made therein and alternatives substituted for certain of the described procedures without departing substantially from the invention as defined in the appended claims.

We claim:

1. In a process for treating hydrocarbon materials containing minor amounts of fluorine compounds as impurities by contact with a bauxite containing siliceous material under conditions such that fluorine is retained by said bauxite and silicon tetrafluoride is formed from such siliceous material, the improvement which comprises, passing a hydrocarbon material effluent from such a treatment with such a bauxite, and containing said silicon tetrafluoride, into the bottom of a purification zone comprising a lower contacting zone and an upper filtration zone, passing an aqueous solution of sodium hydroxide to the top of said contacting zone and contacting same therein with said hydrocarbon material to dissolve said silicon tetrafluoride therein, and passing said hydrocarbon material upwardly through said contact zone and subsequently upwardly through said filtration zone to remove entrained sodium hydroxide solution.

2. In a process for treating hydrocarbon materials containing minor amounts of fluorine compounds as impurities by contact with a bauxite containing siliceous material under conditions such that fluorine is retained by said bauxite and silicon tetrafluoride is formed from such siliceous material, the improvement which comprises, passing a hydrocarbon material effluent from such a treatment with such a bauxite, and containing said silicon tetrafluoride, into contact with an aqueous solution of sodium hydroxide to remove said silicon tetrafluoride by solution therein.

3. In a process for treating hydrocarbon materials containing minor amounts of fluorine compounds as impurities by contact with a bauxite containing siliceous material under conditions such that fluorine is retained by said bauxite and silicon tetrafluoride is formed from such siliceous material, the improvement which comprises, passing a hydrocarbon material effluent from such a treatment with such a bauxite, and containing said silicon tetrafluoride, into contact with an aqueous alkaline solution to remove said silicon tetrafluoride by solution therein.

4. The process of claim 1 in which said filtration zone contains a granular carbonaceous material selected from the group consisting of anthracite coal, petroleum coke and wood charcoal.

5. The process of claim 1 in which said filtration zone contains granular anthracite coal.

GERALD A. IBACH.
CARMEN C. TATE.